(12) United States Patent
Shijo et al.

(10) Patent No.: US 9,331,371 B2
(45) Date of Patent: May 3, 2016

(54) WAVEGUIDE CONNECTING STRUCTURE, ANTENNA DEVICE AND RADAR DEVICE

(71) Applicant: Kabushiki Kaisha Toshiba, Minato-ku (JP)

(72) Inventors: Tetsu Shijo, Tokyo (JP); Koh Hashimoto, Yokohama (JP); Shuichi Obayashi, Yokohama (JP)

(73) Assignee: KABUSHIKI KAISHA TOSHIBA, Minato-ku (JP)

( * ) Notice: Subject to any disclaimer, the term of this patent is extended or adjusted under 35 U.S.C. 154(b) by 350 days.

(21) Appl. No.: 13/939,673

(22) Filed: Jul. 11, 2013

(65) Prior Publication Data
US 2014/0015709 A1      Jan. 16, 2014

(30) Foreign Application Priority Data

Jul. 13, 2012   (JP) ................................. 2012-157720

(51) Int. Cl.
| | |
|---|---|
| *G01S 13/06* | (2006.01) |
| *H01P 3/00* | (2006.01) |
| *H01Q 13/18* | (2006.01) |
| *H01P 5/19* | (2006.01) |
| *H01P 5/12* | (2006.01) |
| *G01S 13/44* | (2006.01) |

(52) U.S. Cl.
CPC .................. *H01P 3/003* (2013.01); *G01S 13/06* (2013.01); *H01P 5/12* (2013.01); *H01P 5/19* (2013.01); *H01Q 13/18* (2013.01); *G01S 13/44* (2013.01)

(58) Field of Classification Search
CPC ......... G01S 13/06; G01S 13/44; H01P 3/003; H01P 5/12; H01P 5/19; H01Q 13/18

USPC ............................ 333/239; 342/195; 343/771
See application file for complete search history.

(56) References Cited

U.S. PATENT DOCUMENTS

| 4,720,691 A | 1/1988 | Rammos |
| 5,579,019 A | 11/1996 | Uematsu et al. |

(Continued)

FOREIGN PATENT DOCUMENTS

| JP | 7-106847 A | 4/1995 |
| JP | 2001-156510 A | 6/2001 |

(Continued)

OTHER PUBLICATIONS

Office Action issued Jul. 4, 2014 in Japanese Patent Application No. 2012-157720 (with English language translation).

*Primary Examiner* — Timothy A Brainard
(74) *Attorney, Agent, or Firm* — Oblon, McClelland, Maier & Neustadt, L.L.P.

(57) ABSTRACT

There is provided a waveguide connecting structure, including first, second, third and fourth waveguides. A first coupling window at one of magnetic field planes of the third waveguide couples the first and third waveguides in such a manner that the electric field planes of both are in parallel. A second coupling window formed at one of the electric field planes of the third waveguide couples the second and third waveguides in such a manner that the electric field planes of the second waveguide is in parallel with the magnetic field planes of the first waveguide. A third coupling window formed at the other one of the electric field planes couples the fourth and third waveguides in such a manner that the electric field planes of the fourth waveguide is in parallel with the magnetic field planes of the first waveguide.

17 Claims, 10 Drawing Sheets

(56) References Cited

U.S. PATENT DOCUMENTS

| | | | |
|---|---|---|---|
| 6,563,398 B1* | 5/2003 | Wu | H01Q 21/0037 333/137 |
| 7,750,762 B2 | 7/2010 | Okano | |
| 8,169,363 B2 | 5/2012 | Shijo et al. | |
| 8,305,260 B2 | 11/2012 | Shijo et al. | |
| 2008/0238579 A1* | 10/2008 | Okano | H01P 1/02 333/21 A |
| 2010/0123619 A1 | 5/2010 | Shijo et al. | |
| 2013/0154764 A1* | 6/2013 | Runyon | H01P 5/12 333/135 |
| 2013/0314172 A1* | 11/2013 | Massman | H01P 5/20 333/122 |

FOREIGN PATENT DOCUMENTS

| | | |
|---|---|---|
| JP | 2011-149898 A | 8/2011 |
| JP | 4825250 | 9/2011 |
| JP | 4996640 | 5/2012 |
| JP | 2012-199659 | 10/2012 |
| WO | WO 2005/099026 A1 | 10/2005 |

* cited by examiner

WAVEGUIDE CONNECTING STRUCTURE, ANTENNA DEVICE AND RADAR DEVICE

CROSS REFERENCE TO RELATED APPLICATIONS

This application is based upon and claims the benefit of priority from the prior Japanese Patent Application No. 2012-157720 filed on Jul. 13, 2013, the entire contents of which are incorporated herein by reference.

FIELD

Embodiments described here relate to a waveguide connecting structure, an antenna device and a radar device.

BACKGROUND

There is known a waveguide bend that connects two waveguides which differ in waveguide axis direction. The conventional waveguide bend connects waveguides so that respective electric field planes (E-planes) or magnetic field planes (H-planes) of the two waveguides that are connected is in parallel with each other.

There is known a post wall waveguide (also called a dielectric waveguide or a substrate integrated waveguide and the like) that is constituted of a via-hole array that is formed on a dielectric substrate, and copper foils bonded onto both surfaces of the dielectric substrate. As a coupler that connects a post wall waveguide and a waveguide, there is a coupler that uses a bend structure.

In the conventional waveguide bend structure described above, the E-planes or the H-planes of the two waveguides that differ in waveguide axis direction are disposed to be parallel with each other. However, the disposition is sometimes required so that the H-planes of one of the waveguides and the E-planes of the other one of the waveguides is in parallel. If both are coupled so that the H-planes of one of the waveguides and the E-planes of the other one of the waveguides are parallel with each other, signals cannot be coupled between these waveguides. For example, when a high-frequency signal of a TE10 mode is inputted from one of the waveguides, the high-frequency signal is brought into a TM mode having an electric field component in the waveguide axis direction, with respect to the other one of the waveguides. Therefore, the high-frequency signal has a higher-order mode with respect to the other one of the waveguides to be cut off and cannot be coupled.

DETAILED DESCRIPTION

According to some embodiments, there is provided a waveguide connecting structure, including a first waveguide, a second waveguide, a third waveguide and a fourth waveguide.

The first waveguide includes a pair of electric field planes and a pair of magnetic field planes.

The second waveguide includes a pair of electric field planes and a pair of magnetic field planes.

The third waveguide includes a pair of electric field planes and a pair of magnetic field planes.

The fourth waveguide includes a pair of electric field planes and a pair of magnetic field planes.

The third waveguide has a first coupling window formed at one of the magnetic field planes of the third waveguide, a second coupling window formed at one of the electric field planes of the third waveguide, a third coupling window formed at the other one of the electric field planes of the third waveguide, and a first shorted plane and a second shorted plane that close ends of the third waveguide.

The first coupling window couples one end of the first waveguide to the third waveguide in such a manner that the electric field planes of the first waveguide are in parallel with the electric field planes of the third waveguide.

The second coupling window couples one end of the second waveguide to the third waveguide in such a manner that the electric field planes of the second waveguide is in parallel with the magnetic field planes of the first waveguide.

The third coupling window couples one end of the fourth waveguide to the third waveguide in such a manner that the electric field planes of the fourth waveguide is in parallel with the magnetic field planes of the first waveguide.

Hereinafter, embodiments will be described with reference to the drawings.

First Embodiment

Figure 1:
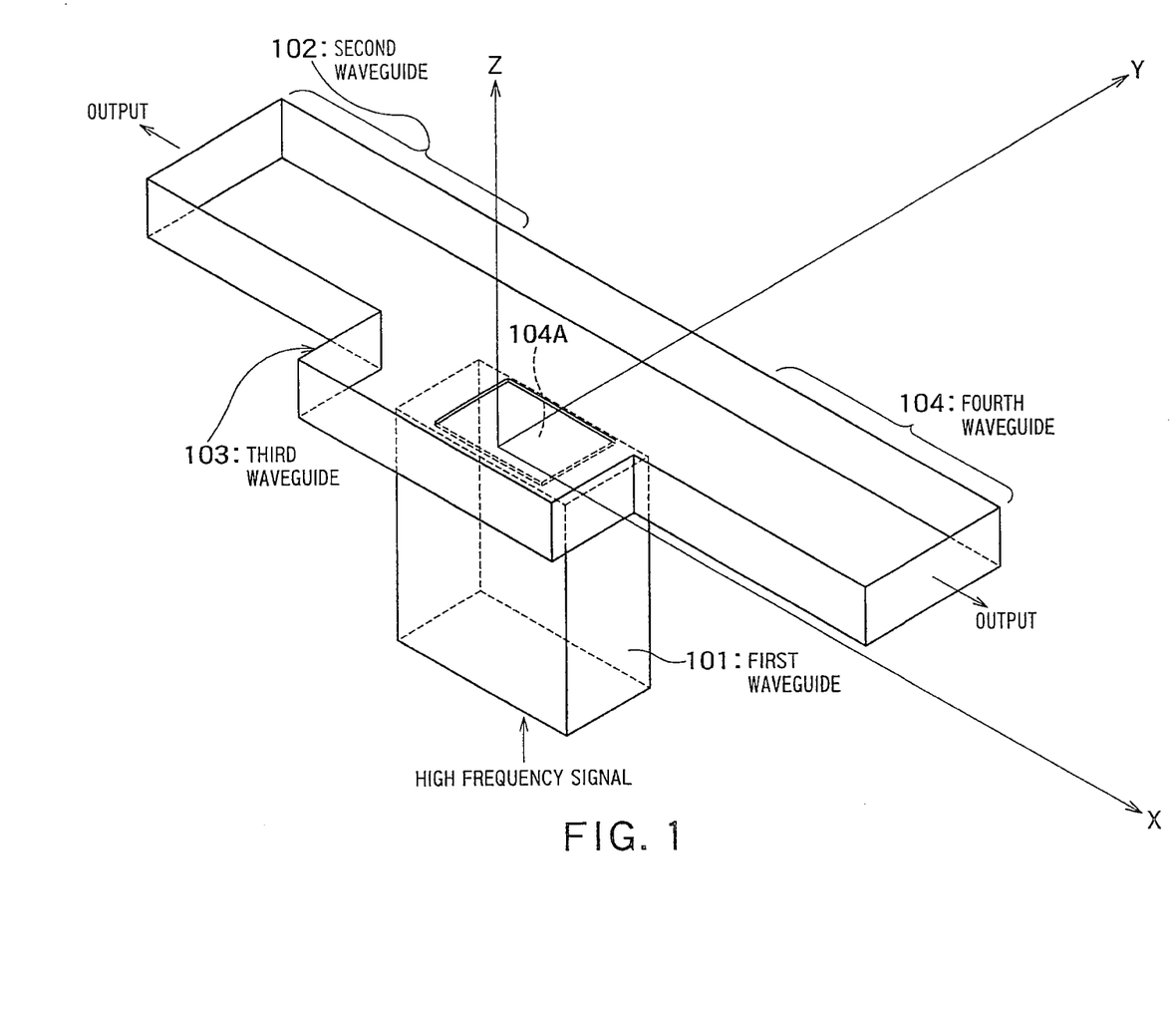
FIG. 1 is a perspective view of a waveguide connecting structure according to a first embodiment.
Figure 2:
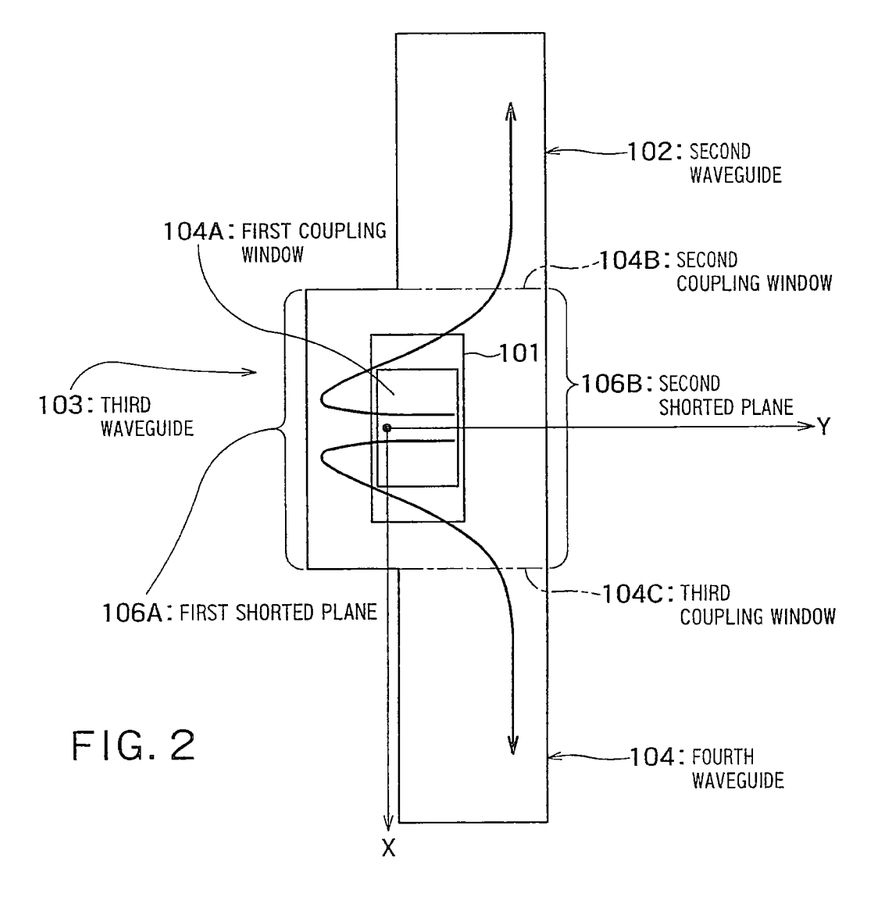
FIG. 2 is a top view of the structure shown in FIG. 1.

FIG. 1 is a perspective view of a waveguide connecting structure according to a first embodiment. FIG. 2 is a top view (view seen from above in a Z-axis direction) of the structure.

The waveguide connecting structure of FIG. 1 includes a first waveguide 101, a second waveguide 102, a third waveguide 103 and a fourth waveguide 104. Waveguide axis directions of the second waveguide 102 and the fourth waveguide 104 are the same. The waveguide axis directions (X-axis direction) of the second waveguide 102 and the fourth waveguide 104, a waveguide axis direction (Y-axis direction) of the third waveguide 103, and a waveguide axis direction (Z-axis direction) of the first waveguide 101 are orthogonal to each other.

Figure 3:
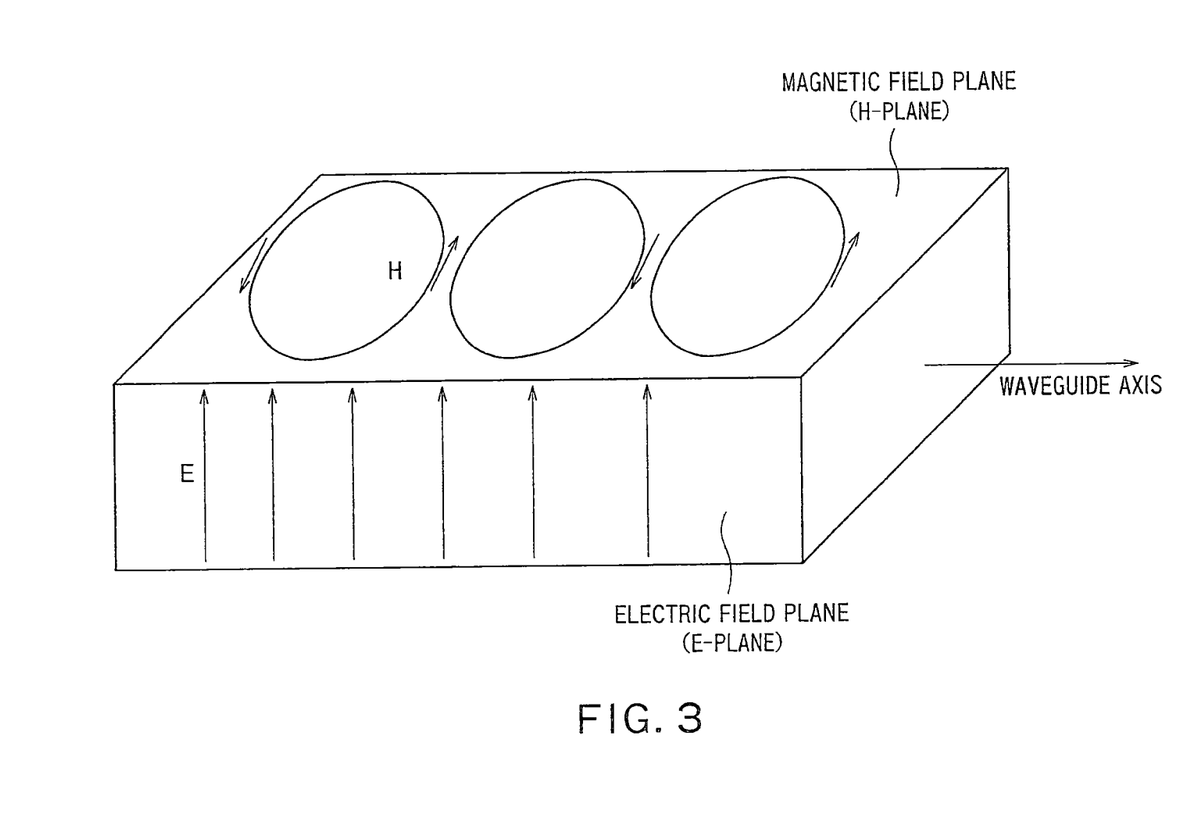
FIG. 3 is an explanatory view of a magnetic field plane and an electric field plane.

The waveguides 101 to 104 are each formed by a pair of electric field planes (E-planes) and a pair of magnetic field planes (H-planes). As shown in FIG. 3, a plane with a wide width along the waveguide axis direction corresponds to the H-plane, and a narrow plane corresponds to the E-plane. The electric field planes and the magnetic field planes of the waveguides 101 to 104 are formed by metallic plates such as a copper, for example.

The magnetic field planes (H-planes) of the first waveguide 101, and the electric field planes (E-planes) of the second waveguide 102 and the fourth waveguide 104 are parallel with each other. Further, the E-planes of the first waveguide 101 and the E-planes of the third waveguide 103 are parallel with each other.

Both ends of the first waveguide 101, the second waveguide 102 and the fourth waveguide 104 are opened.

Both ends of the third waveguide 103 are closed by shorted planes 106A and 106B, as shown in FIG. 2. Note that the shorted plane 106B continues to one of the respective E-planes of the second waveguide 102 and the fourth waveguide 104 to form the same plane.

Further, the third waveguide 103 is provided with coupling windows 104A, 104B and 104C.

The coupling window 104B is provided at one of the E-planes of the third waveguide 103. One end of the second waveguide 102 is coupled to the third waveguide 103 via the coupling window 104B. At this time, the E-planes of the second waveguide 102 are parallel with the H-planes of the first waveguide 101. Namely, the coupling window 104B couples the E-planes of the second waveguide 102 and the H-planes of the first waveguide 101 parallel with each other. The other end of the second waveguide 102 is an input/output port for a high-frequency signal.

Likewise, the coupling window 104C is provided at the other one of the E-planes of the third waveguide 103. One end of the fourth waveguide 104 is coupled to the third waveguide 103 via the coupling window 104C. At this time, the E-planes of the fourth waveguide 104 are parallel with the H-planes of the first waveguide 101. Namely, the coupling window 104C couples the E-planes of the fourth waveguide 104 and the H-planes of the first waveguide 101 parallel with each other. The other end of the second waveguide 104 is an input/output port for a high-frequency signal.

In the present example, the second waveguide 102 and the fourth waveguide 104, and the third waveguide 103 are integrally formed physically. Part or all of them may be formed by folding from one metallic plate, or may be formed by bonding a plurality of metallic plate members. In the present example, the H-planes of the second waveguide 102 and the fourth waveguide 104, and the H-planes of the third waveguide 103 continue to form the same plane at the same height. The H-planes of the second waveguide 102 and the fourth waveguide 104, and the H-planes of the third waveguide 103 may be at different heights respectively. The third waveguide 103 forms H-bend structures respectively with the second waveguide 102 and the fourth waveguide 104.

The coupling window 104A is formed at the H-plane (lower side) of the third waveguide 103. In the coupling window 104A, a size of a side that is parallel with the shorted plane 106A is longer than a side that is perpendicular to the shorted plane 106A.

One end of the first waveguide 101 is coupled to the third waveguide 103 via the coupling window 104A. At this time, the E-planes of the first waveguide 101 and the E-planes of the third waveguide 103 are parallel with each other. Namely, the coupling window 104A couples the E-planes of the first waveguide 101 and the E-planes of the third waveguide 103 parallel with each other. At one end of the first waveguide 101, an opening thereof is narrowed to be adapted to a shape of the coupling window 104A. The other end of the first waveguide 101 is an input/output port for a high-frequency signal.

Note that if the size of the coupling window 104A is adapted to a line width of the first waveguide 101, the opening of the first waveguide 101 does not have to be narrowed. In the present example, the first waveguide 101 and the third waveguide 103 are separately configured, and are coupled by positioning, but the first waveguide 101 and the third waveguide 103 may be integrally formed physically.

The waveguide connecting structure of FIG. 1 enables transmission of a high-frequency signal from the first waveguide 101 to the second waveguide 102 and the fourth waveguide 104, by interposing the third waveguide 103 between the first waveguide 101, and the second waveguide 102 and the fourth waveguide 104. An operation thereof will be described as follows.

When a high-frequency signal of a TE10 mode is inputted from the first waveguide 101, the high-frequency signal has a high-order mode having an antisymmetric electromagnetic field shape such as a TE20 mode and a TE40 mode. Therefore, if the third waveguide is not provided, and one end of the first waveguide 101 is coupled to the H-plane of the second or the fourth waveguide, the high-frequency signal is not coupled to the second or the fourth waveguide, and is cut off. In contrast with this, when the third waveguide 103 is interposed as in the present embodiment, the E-planes of the first and the third waveguides are parallel with each other, and therefore, the high-frequency signal from the first waveguide is coupled to the third waveguide first. The high-frequency signal which is coupled to the third waveguide reflects on the shorted plane 106A of the third waveguide 103 as shown in FIG. 2. The H-planes of the third waveguide 103, and the H-planes of the second waveguide 102 and the fourth waveguide 104 are parallel with each other, and therefore, the high-frequency signal which is reflected on the shorted plane 106A is coupled to the second waveguide 102 and the fourth waveguide 104 respectively, and is transmitted to the respective openings. By the above operation, the high-frequency signal which flows in the first waveguide 101 is also propagated to the second waveguide 102 and the fourth waveguide 104 which are disposed in such a manner that the E-planes thereof are not parallel with the E-planes of the first waveguide. The present waveguide connecting structure is operated as a two-branch power divider.

Conversely, also when electromagnetic waves (high-frequency signals) of a TE10 mode are inputted from the second waveguide and the fourth waveguide, the electromagnetic waves are respectively coupled (power synthesis) to the first waveguide via the third waveguide by the inverse operation from the above description. If the third waveguide is not provided, the high-frequency signals that are inputted from the second waveguide and the fourth waveguide each have a TM mode having an electric field component in the waveguide axis direction, with respect to the first waveguide, are cut off as a high-order mode, and are not coupled to the first waveguide.

As above, according to the present embodiment, the third waveguide 103 having the E-planes parallel with the E-planes of the first waveguide 101, and having the H-planes parallel with the H-planes of the second waveguide 102 and the fourth waveguide 104 is interposed between the first waveguide 101, and the second waveguide 102 and the fourth waveguide 104, whereby transmission of a high-frequency signal from the first waveguide 101 to the second waveguide 102 and the fourth waveguide 104 is enabled.

Second Embodiment

Figure 4:
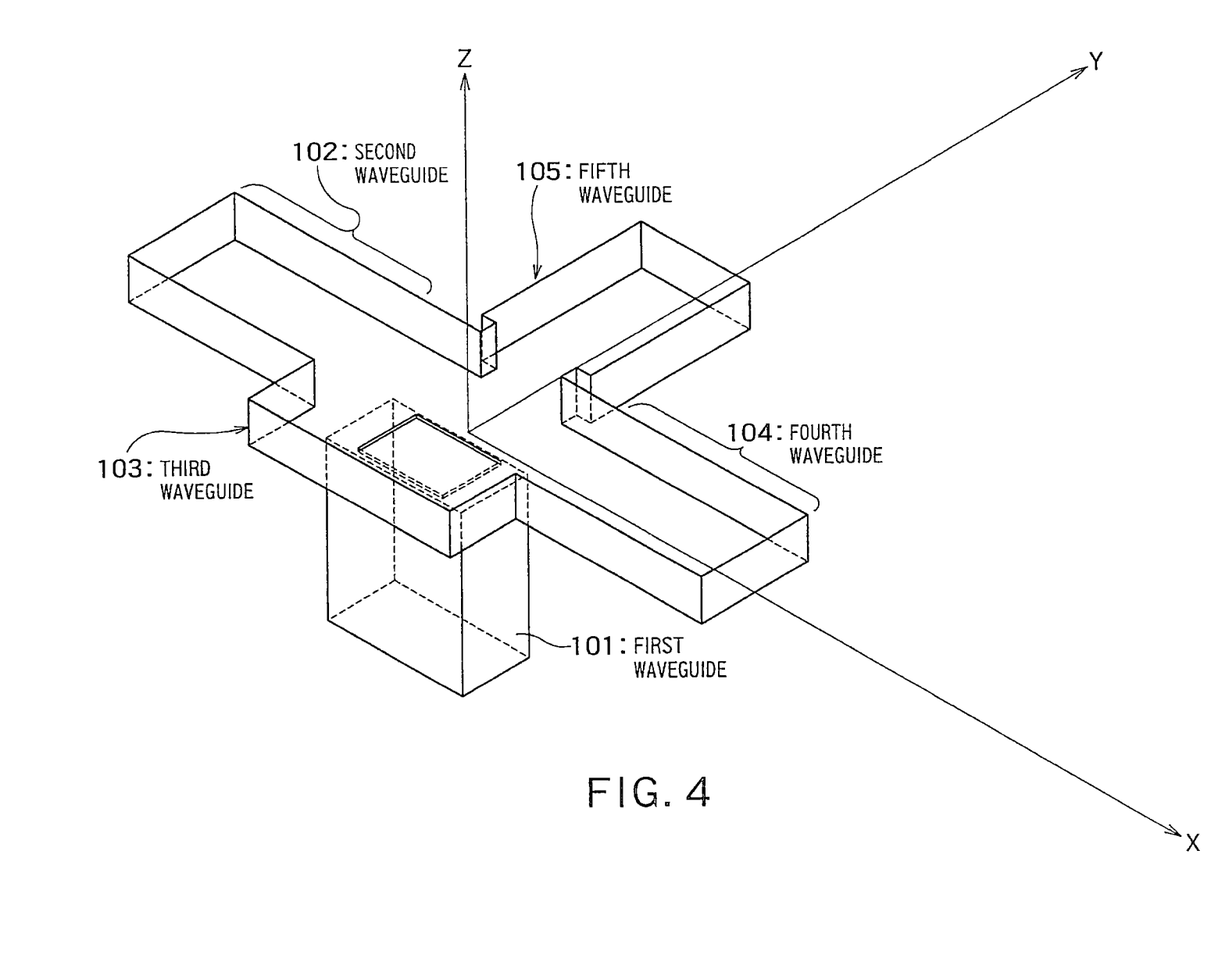
FIG. 4 is a perspective view of a waveguide connecting structure according to a second embodiment.
Figure 5:
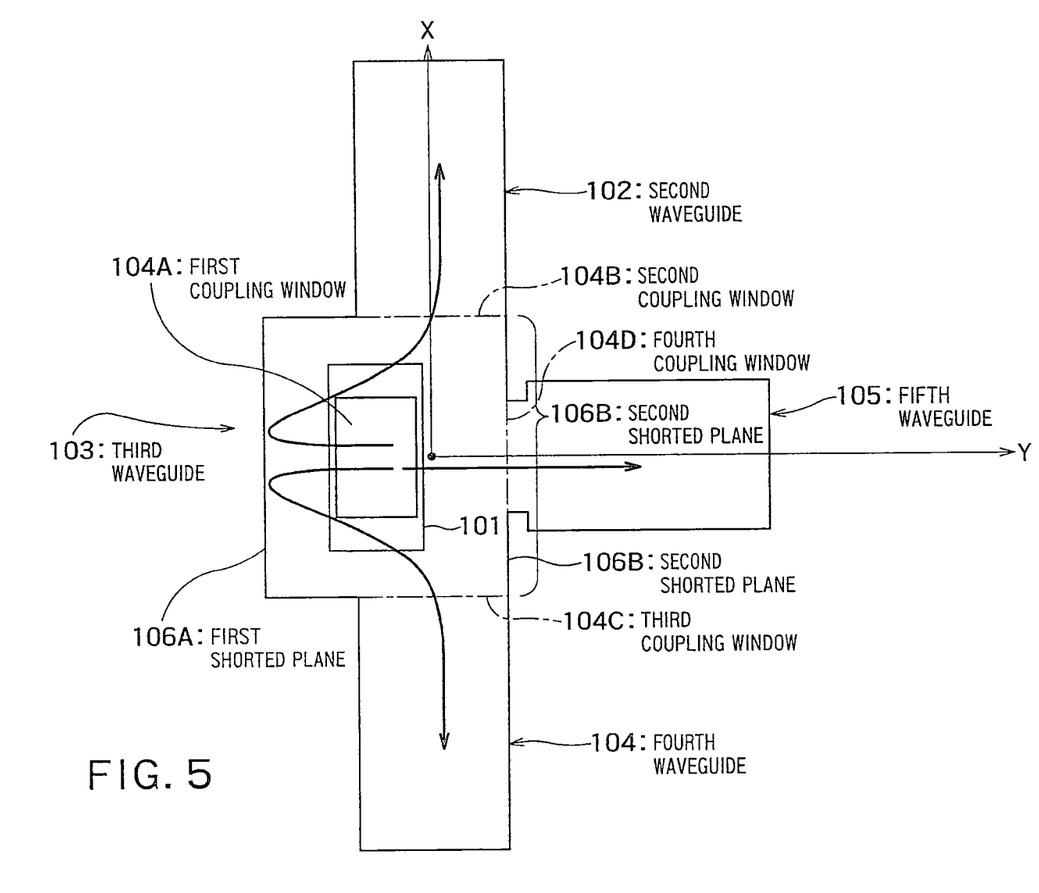
FIG. 5 is a top view of the structure of FIG. 4.

FIG. 4 is a perspective view of a waveguide connecting structure according to a second embodiment. FIG. 5 is a top view of the structure. The elements with the same names in FIGS. 1 and 2 are assigned with the same reference signs, and the redundant description will be omitted except for changed parts.

A main point that is different from the first embodiment lies in that a fifth waveguide 105 is added. The shorted plane 106B of the third waveguide 103 is provided with a fourth coupling window 104D.

The fifth waveguide 105 is formed by a pair of electric field planes (E-planes) and a pair of magnetic field planes (H-planes). Both ends of the fifth waveguide 105 are opened. One end of the fifth waveguide 105 is coupled to the third waveguide 103 via the fourth coupling window 104D. H-planes of the fifth waveguide 105 are parallel with the H-planes of the third waveguide 103. Further, E-planes of the fifth waveguide 105 are parallel with the E-planes of the first waveguide. The other end of the fifth waveguide 105 is an input/output port for a high-frequency signal.

A high-frequency signal of a basic mode, a TE10 mode that is inputted from the first waveguide 101 is coupled to the second and the fourth waveguides via the third waveguide by the same principle as the first embodiment, and further in the present embodiment, the high-frequency signal is also coupled to the fifth waveguide. Namely, as shown in FIG. 5, the signal which is reflected on the shorted plane 106A of the third waveguide is coupled to the second, the fourth and the fifth waveguides the H-planes of which are parallel with those of the third waveguide, respectively. Namely, the signal is branched into three, and is transmitted to the openings of the second, the fourth and the fifth waveguides. Accordingly, the present structure operates as a three-branch power divider.

As above, according to the present embodiment, the third waveguide 103 that has the E-planes parallel with those of the first waveguide 101, and has the H-planes parallel with those of the second waveguide 102, the fourth waveguide 104 and the fifth waveguide 105 is interposed between the first waveguide 101, and the second waveguide 102 and the fourth waveguide 104, whereby transmission of a high-frequency signal from the first waveguide 101 to the second waveguide 102, the fourth waveguide 104 and the fifth waveguide 105 is enabled.

Third Embodiment

Figure 6:
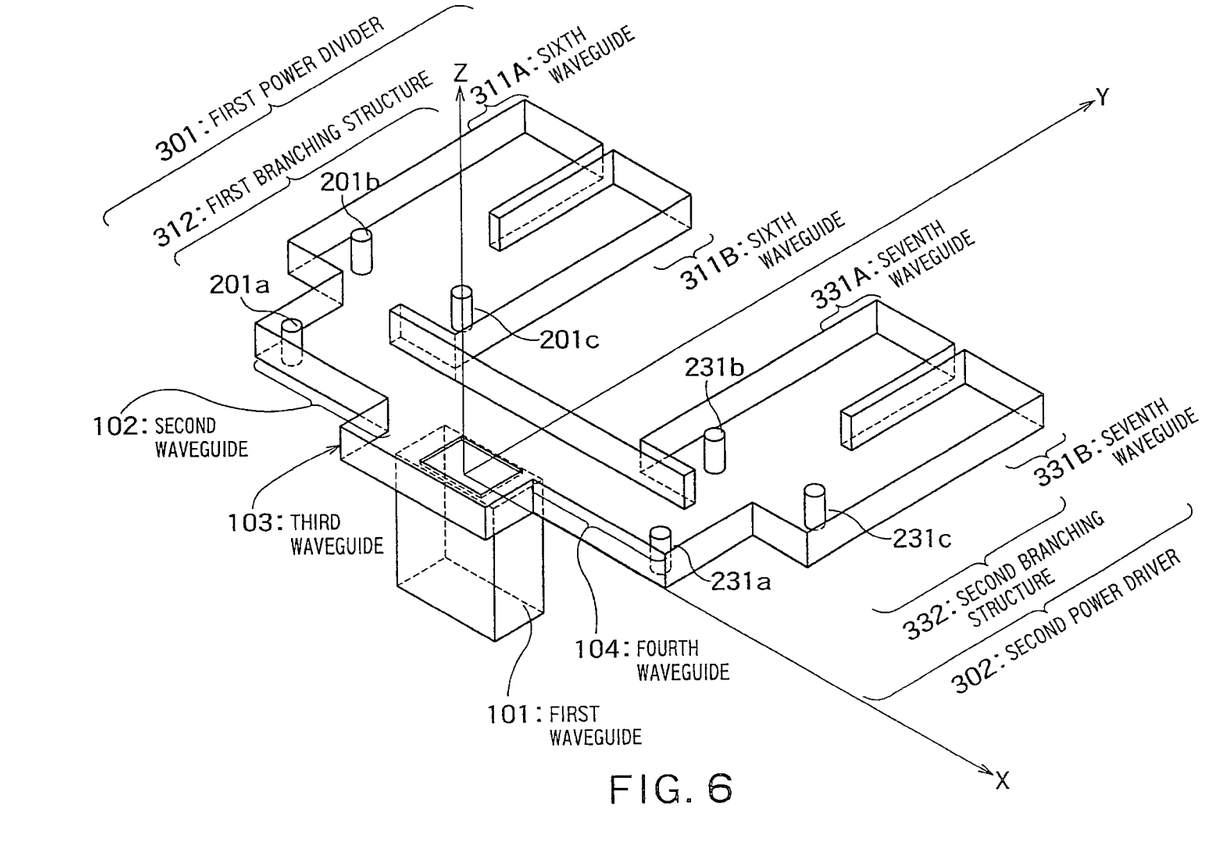
FIG. 6 is a perspective view of a waveguide connecting structure according to a third embodiment.

FIG. 6 is a perspective view of a waveguide connecting structure according to a third embodiment.

In the waveguide connecting structure, a first power divider 301 and a second power divider 302 are coupled to the respective openings (the other ends) of the second waveguide and the fourth waveguide shown in FIG. 1.

The power divider 301 includes two sixth waveguides 311A and 311B, and a first branching structure (first waveguide branching structure) 312 that branches the other end of the second waveguide 102 into the sixth waveguides 311A and 311B. In the first branching structure 312, reflection suppressing posts 201a, 201b and 201c for suppressing reflection are disposed.

The sixth waveguides 311A and 311B and the first branching structure 312 are coupled so that the H-planes are parallel with each other. Accordingly, a high-frequency signal that is inputted from the second waveguide 102 to the first branching structure 312 is respectively branched into the sixth waveguides 311A and 311B. Namely, the high-frequency signal is divided into two in power.

The second power divider 302 has a configuration similar to the power divider 301. Namely, the second power divider 302 includes two seventh waveguides 331A and 331B, and a second branching structure (second waveguide branching structure) 332 that branches the other end of the fourth waveguide 104 into the seventh waveguides 331A and 331B.

In the second branching structure 332, reflection suppressing posts 231a, 231b and 231c for suppressing reflection are disposed.

The seventh waveguides 331A and 331B and the second branching structure 332 are coupled so that the H-planes are parallel with each other. Accordingly, a high-frequency signal that is inputted from the fourth waveguide 104 to the second branching structure 332 is respectively branched into the seventh waveguides 331A and 331B. Namely, the high-frequency signal is divided into two in power.

As above, according to the present embodiment, a high-frequency signal can be branched into four through the second and the fourth waveguides from the first waveguide.

Fourth Embodiment

Figure 7:
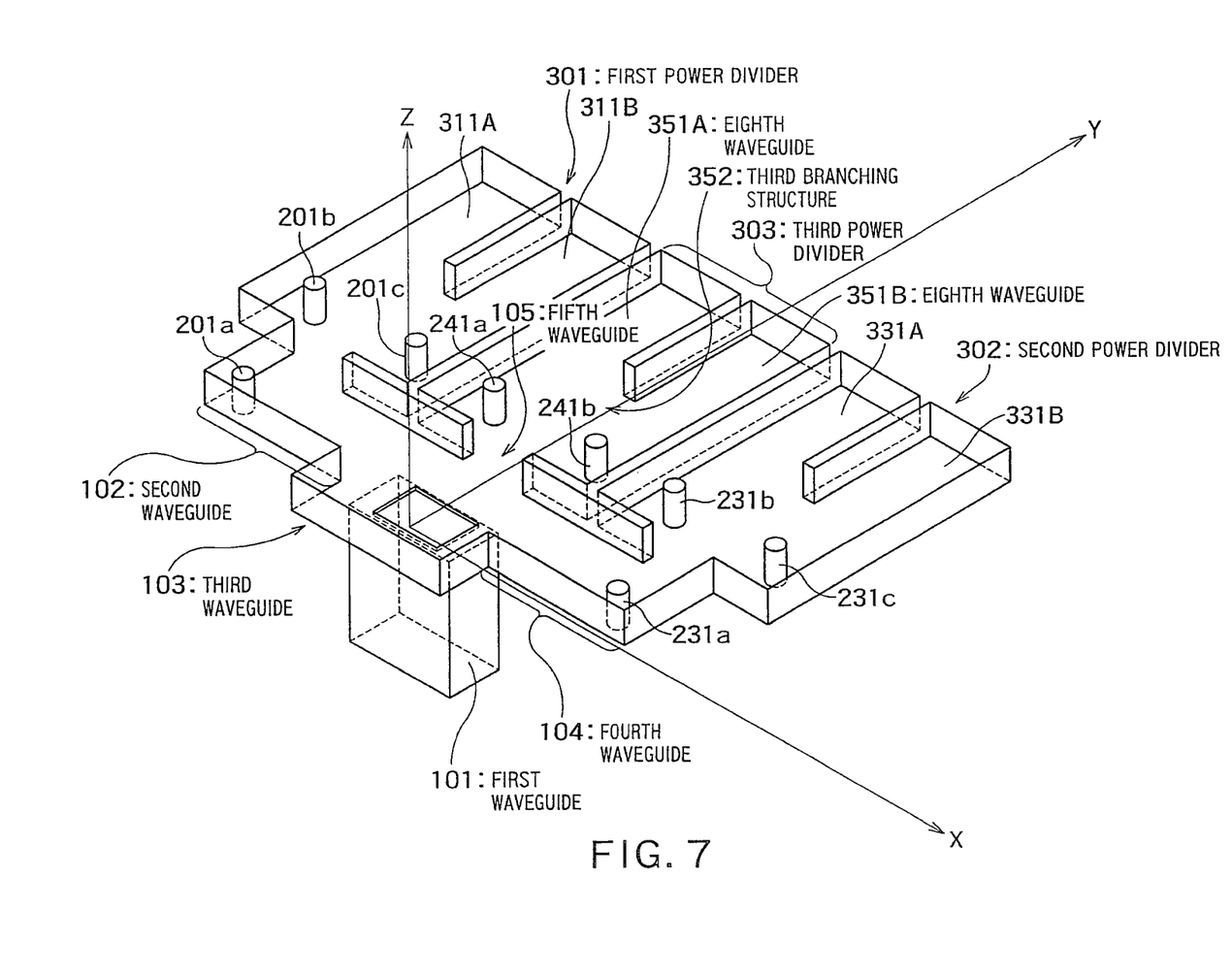
FIG. 7 is a perspective view of a waveguide connecting structure according to a fourth embodiment.

FIG. 7 is a perspective view of a waveguide connecting structure according to a fourth embodiment.

The waveguide connecting structure is a structure in which the first power divider 301, the second power divider 302 and a third power divider 303 are respectively coupled to the respective openings (the other ends) of the second waveguide, the fourth waveguide and the fifth waveguide shown in FIG. 2.

The first and the second power dividers 301 and 302 are similar to the third embodiment, and therefore, the description thereof will be omitted.

The third power divider 303 includes two eighth waveguides 351A and 351B, and a third branching structure (third waveguide branching structure) 352 which branches the other end of the fifth waveguide 105 into the eighth waveguides 351A and 351B. In the third branching structure 352, reflection suppressing posts 241a and 241b for suppressing reflection are disposed.

The eighth waveguides 351A and 351B and the third branching structure 352 are coupled to each other in such a manner that H-planes thereof are parallel with each other. Accordingly, a high-frequency signal that is inputted from the other end of the fifth waveguide 105 into the third branching structure 352 is branched into the eighth waveguides 351A and 351B respectively. Namely, the high-frequency signal which is coupled to the fifth waveguide 105 from the first waveguide 101 is divided in two in power.

As above, according to the present embodiment a high-frequency signal can be branched into six from the first waveguide through the second, the fourth and the fifth waveguides.

Fifth Embodiment

Figure 8:
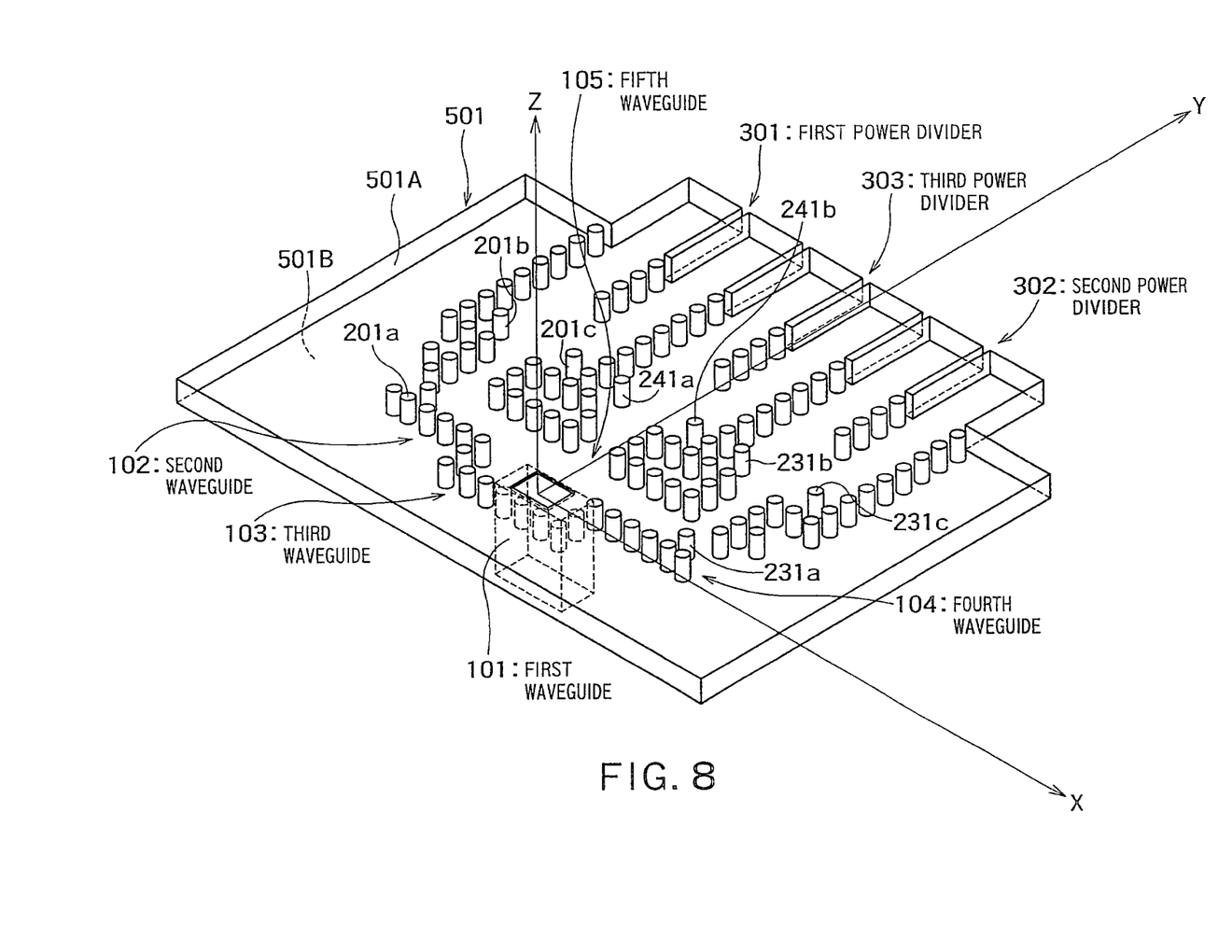
FIG. 8 is a perspective view of a waveguide connecting structure according to a fifth embodiment.

FIG. 8 is a perspective view of a waveguide connecting structure according to a fifth embodiment.

The structure is the configuration similar to the fourth embodiment shown in FIG. 7 and is realized by using a dielectric substrate.

A dielectric substrate 501 has both surfaces covered with metallic films 501A and 501B. The metallic film is, for example, a copper foil film. In the dielectric substrate 501, via-holes that penetrate through the metallic films 501A and 501B are disposed with spaces from each other. An array of the via-holes disposed with spaces from each other forms the electric field planes of the second waveguide 102, the first and the second shorted planes of the third waveguide 103, the electric field planes of the third waveguide 103, the electric field planes of the fourth waveguide 104, and the electric field planes of the fifth waveguide 105. Note that among the via-holes, those assigned with reference signs 201a, 201b, 201c, 231a, 231b, 231c, 241a, and 241b are reflection suppressing posts. The via-holes assigned with no reference signs correspond to the via-holes that form the electric field planes and the first and the second shorted planes described above.

Further, the magnetic field planes of the second waveguide 102, the magnetic field planes of the third waveguide 103, the magnetic field planes of the fourth waveguide 104, and the magnetic field planes of the fifth waveguide 105 are formed by parts of the metallic films 501A and 501B which are surrounded by the via-holes which forms the respective electric field planes.

The waveguide which is configured by the via-hole array and the metallic films like this is called a post wall waveguide, a dielectric waveguide (or substrate integrated waveguide) or the like.

Note that the coupling window 104A which couples the first waveguide 101 is formed as an opening that is formed in the metallic film 501B on the dielectric substrate.

The waveguide connecting structure is configured by using a dielectric substrate, and thereby, reflectance properties can be improved on a wide band.

Although in the present embodiment, an example of realizing the structure similar to FIG. 7 with the dielectric substrate is shown, the structures of FIGS. 1, 4 and 6 can be similarly realized with dielectric substrates.

Sixth Embodiment

Figure 9:
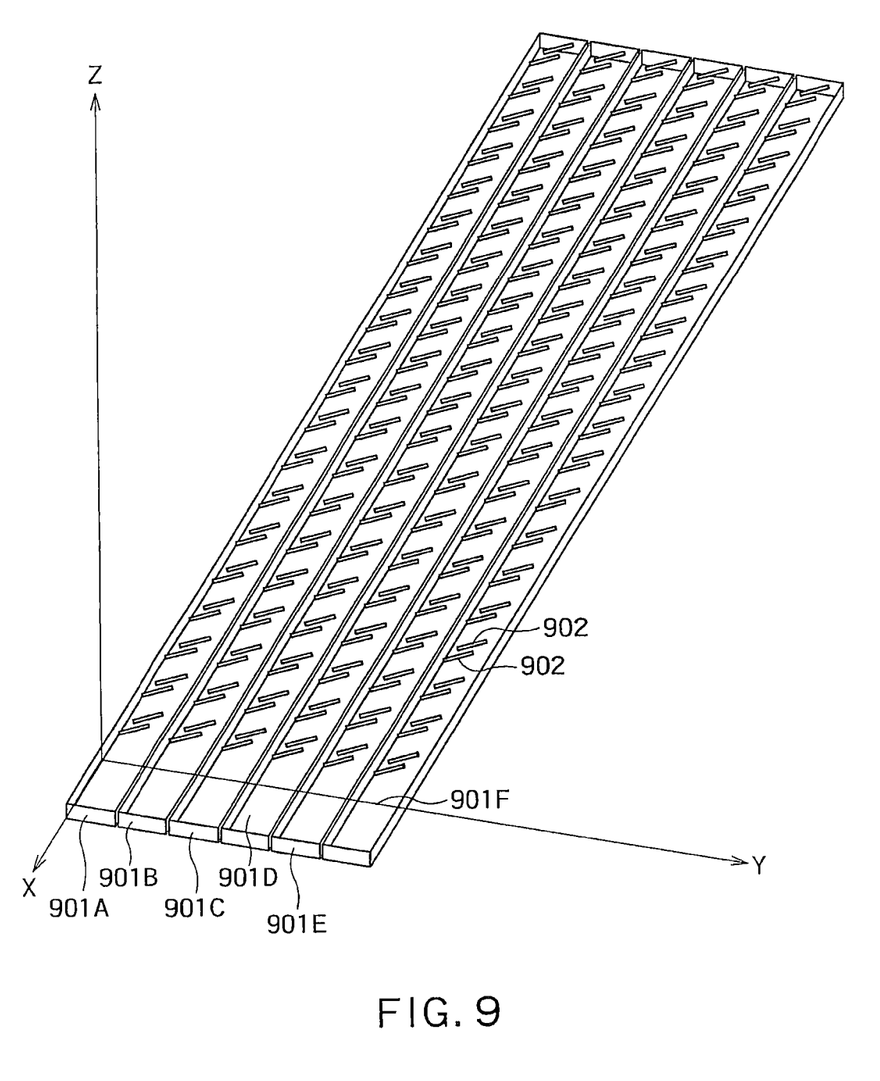
FIG. 9 is a view showing an example of a slot array antenna according to a sixth embodiment.

FIG. 9 shows a slot array antenna that is connected to the waveguide connecting structure shown in FIG. 7 or FIG. 8. The slot array antenna is connected to the waveguide connecting structure, and thereby an antenna device is formed.

The slot array antenna includes six waveguides 901A, 901B, 901C, 901D, 901E and 901F, and slots 902 that are respectively formed on surfaces of the respective waveguides. These waveguides may be post wall waveguides that are formed on a dielectric substrate. One ends (lower sides) of the waveguides 901A to 901F are connected to the first power divider 301, the third power divider 303 and the second power divider 302 shown in FIG. 7 or FIG. 8.

Specifically, the one ends of the waveguides 901A and 901B are connected to the sixth waveguides 311A and 311B in the first power divider 301. The one ends of the waveguides 901C and 901D are connected to the eighth waveguides 351A and 351B in the third power divider 303. The one ends of the waveguides 901E and 901F are connected to the seventh waveguides 331A and 331B in the second power divider 302.

High-frequency signals that are inputted into the waveguides 901A to 901F from the power dividers 301, 303 and 302 are irradiated into a space as radio waves via the slots 902.

In the present embodiment, the slot array antenna with the number of elements being six, which is connected to the waveguide connecting structure shown in FIG. 7 or FIG. 8 is shown. An antenna device in which a slot array with the number of elements being four is connected to the waveguide connecting structure shown in FIG. 6 can be similarly configured.

Seventh Embodiment

Figure 10:
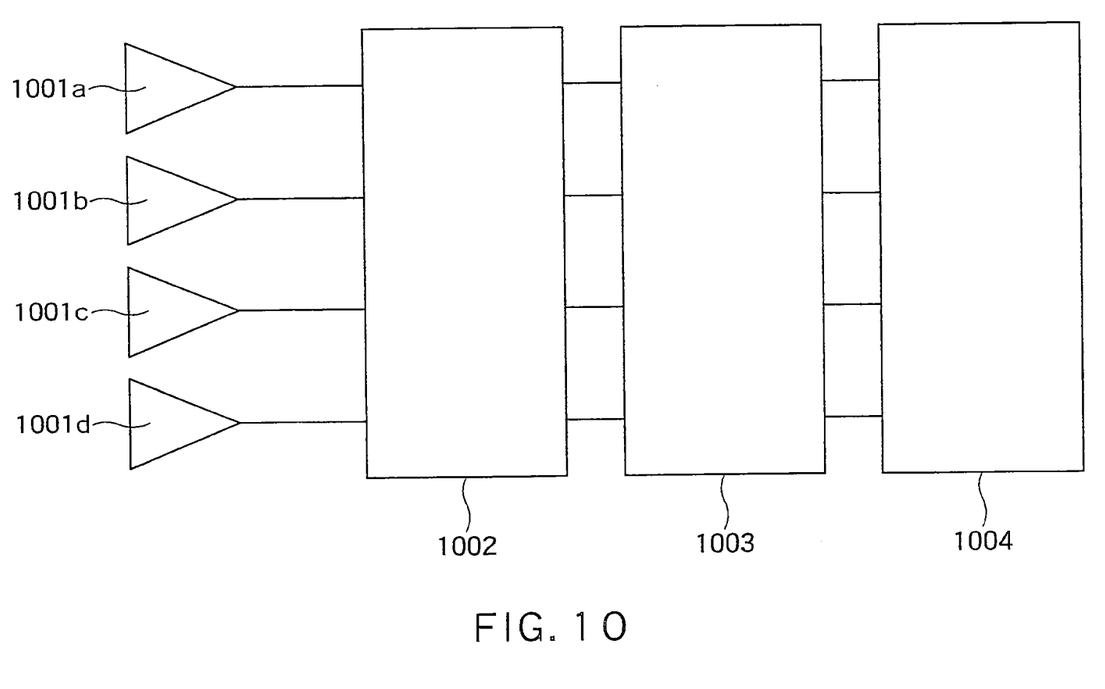
FIG. 10 is a view showing an example of a radar device according to a seventh embodiment.

FIG. 10 shows a configuration example of a reception circuit of a radar device according to the present embodiment. The radar device is an example of a radar device that performs angle measurement by a monopulse system.

The radar device includes antennas 1001a, 1001b, 1001c and 1001d, an RF module unit 1002, an AD converting unit 1003, a monopulse DBF ("Digital Beam Forming") unit 1004.

Each of the antennas 1001a to 1001d corresponds to the antenna device (the waveguide connecting structure and the slot array antenna) described in the sixth embodiment. A connecting unit between each of the antennas and the RF module unit 1002 corresponds to the first waveguide unit 101 respectively.

The RF module 1002 performs processing that includes down conversion of signals received in the antennas 1001a, 1001b, 1001c and 1001d which are sub array antennas, and sends the result of the processing to the AD converting unit 1003.

The AD converting unit 1003 generates a digital signal by subjecting the signal sent from the RF module to analog-digital conversion, and sends the generated digital signal to the monopulse DBF unit 1004.

The monopulse DBF unit 1004 estimates a position of a target by using the digital signal sent from the AD converting unit 1003. For the position estimation of the target, a well-known technique is used, and therefore, description of the detailed operation will be omitted.

While certain embodiments have been described, these embodiments have been presented by way of example only, and are not intended to limit the scope of the inventions. Indeed, the novel embodiments described herein may be embodied in a variety of other forms; furthermore, various omissions, substitutions and changes in the form of the embodiments described herein may be made without departing from the spirit of the inventions. The accompanying claims and their equivalents are intended to cover such forms or modifications as would fall within the scope and spirit of the inventions.

The invention claimed is:
1. A waveguide connecting structure, comprising:
a first waveguide including a pair of electric field planes and a pair of magnetic field planes;
a second waveguide including a pair of electric field planes and a pair of magnetic field planes;
a third waveguide including a pair of electric field planes and a pair of magnetic field planes; and
a fourth waveguide including a pair of electric field planes and a pair of magnetic field planes,
wherein the third waveguide has
a first coupling window formed at one of the magnetic field planes of the third waveguide,
a second coupling window formed at one of the electric field planes of the third waveguide,
a third coupling window formed at the other one of the electric field planes of the third waveguide, and
a first shorted plane and a second shorted plane that close ends of the third waveguide,
the first coupling window couples one end of the first waveguide to the third waveguide in such a manner that the electric field planes of the first waveguide are in parallel with the electric field planes of the third waveguide,
the second coupling window couples one end of the second waveguide to the third waveguide in such a manner that the electric field planes of the second waveguide is in parallel with the magnetic field planes of the first waveguide, and
the third coupling window couples one end of the fourth waveguide to the third waveguide in such a manner that the electric field planes of the fourth waveguide is in parallel with the magnetic field planes of the first waveguide.

2. The structure according to claim 1, further comprising:

a fifth waveguide including a pair of electric field planes and a pair of magnetic field planes, wherein a fourth coupling window is formed at the first shorted plane and the fourth coupling window couples one end of the fifth waveguide to the third waveguide in such a manner that the electric field planes of the fifth waveguide is in parallel with the electric field planes of the first waveguide.

3. The structure according to claim 2, comprising:

a plurality of sixth waveguides;

a plurality of seventh waveguides;

a plurality of eighth waveguides;

a first waveguide branching structure branching the other end of the second waveguide into the sixth waveguides;

a second waveguide branching structure branching the other end of the fourth waveguide into the seventh waveguides; and a third waveguide branching structure branching the other end of the fifth waveguide into the eighth waveguides.

4. The structure according to claim 3, wherein the first to third waveguide branching structures include reflection suppressing posts arranged therein.

5. The structure according to claim 1, comprising:

a plurality of fifth waveguides;

a plurality of sixth waveguides;

a first waveguide branching structure branching the other end of the second waveguide into the fifth waveguides; and a second waveguide branching structure branching the other end of the fourth waveguide into the sixth waveguides.

6. An antenna device, comprising:

the waveguide connecting structure according to claim 5; and a slot array antenna connected to the waveguide connecting structure.

7. A radar device, comprising:

a plurality of antenna devices each being the antenna device according to claim 6;

an RF (Radio Frequency) module unit configured to perform processing including down conversion that subjects signals received at the plurality of antenna devices to frequency conversion to obtain conversion signals;

an analog-digital converting unit configured to subject the conversion signals to analog-digital conversion to obtain digital signals; and a monopulse DBF (Digital Beam Forming) unit configured to estimate a position of a target by using the digital signals.

8. The structure according to claim 1, wherein the electric field planes of the second waveguide, the first and the second shorted planes of the third waveguide, the electric field planes of the third waveguide, and the electric field planes of the fourth waveguide are formed by via-holes that is formed in a dielectric substrate both surfaces of which are covered with metallic films, and the magnetic field planes of the second waveguide, the magnetic field planes of the third waveguide, and the magnetic field planes of the fourth waveguide are formed by parts of the metallic films surrounded by the via-holes that form respective electric field planes of the second waveguide and the fourth waveguide.

9. The structure according to claim 1, wherein the second shorted plane continues to one of the electric field planes of the second waveguide.

10. The structure according to claim 1, wherein the second shorted plane continues to one of the electric field planes of the fourth waveguide.

11. The structure according to claim 1, wherein the second waveguide, the fourth waveguide and the third waveguide are integrally formed physically.

12. The structure according to claim 1, wherein the magnetic field planes of the third waveguide are at same heights as those of the magnetic field planes of the second waveguide or the magnetic field planes of the fourth waveguide.

13. The structure according to claim 1, wherein the magnetic field planes of the third waveguide are at different heights from those of the magnetic field planes of the second waveguide or the magnetic field planes of the fourth waveguide.

14. The structure according to claim 1, wherein the third waveguide forms an H-bend structure with the second waveguide.

15. The structure according to claim 1, wherein the third waveguide forms an H-bend structure with the fourth waveguide.

16. The structure according to claim 1, wherein the first coupling window is formed such that a size of a side that is parallel with the first shorted plane is longer than that of a side that is perpendicular to the shorted plane.

17. The structure according to claim 1, wherein the first waveguide and the third waveguide are integrally formed.

* * * * *